(12) United States Patent
Fanini et al.

(10) Patent No.: US 6,677,756 B2
(45) Date of Patent: Jan. 13, 2004

(54) MULTI-COMPONENT INDUCTION INSTRUMENT

(75) Inventors: Otto Fanini, Houston, TX (US); Stanislav W. Forgang, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/922,393

(22) Filed: Aug. 3, 2001

(65) Prior Publication Data
US 2003/0025503 A1 Feb. 6, 2003

(51) Int. Cl.[7] .................................................. G01V 3/18
(52) U.S. Cl. ....................................................... 324/339
(58) Field of Search ......................... 324/225, 338–341, 324/345, 346, 349, 356, 369; 336/234, 212

(56) References Cited

U.S. PATENT DOCUMENTS

| | | |
|---|---|---|
| 5,038,107 A | 8/1991 | Gianzero et al. |
| 5,168,234 A | 12/1992 | Freedman ................... 324/338 |
| 5,339,036 A | 8/1994 | Clark et al. ................. 324/338 |
| 5,453,693 A | 9/1995 | Sinclair et al. ............. 324/324 |
| 5,530,358 A | 6/1996 | Wisler et al. ............... 324/338 |
| 5,781,436 A | 7/1998 | Forgang et al. ............ 364/422 |
| 5,886,526 A | 3/1999 | Wu ............................ 324/338 |
| 5,892,361 A | 4/1999 | Meyer, Jr. et al. |
| 5,939,885 A | 8/1999 | McClure et al. ............ 324/338 |
| 6,084,052 A | 7/2000 | Aufdermarsh et al. ...... 528/125 |
| 6,105,690 A * | 8/2000 | Biglin, Jr. et al. ............ 175/48 |
| 6,188,222 B1 | 2/2001 | Seydoux et al. ............ 324/339 |
| 6,191,586 B1 | 2/2001 | Bittar ......................... 324/339 |
| 6,310,470 B1 * | 10/2001 | Hebing et al. .......... 324/117 R |

FOREIGN PATENT DOCUMENTS

| | | |
|---|---|---|
| EP | 0 466 454 | 1/1992 |
| FR | 2 801 985 | 6/2001 |
| GB | 2 287 324 | 9/1995 |

* cited by examiner

Primary Examiner—Walter E. Snow
Assistant Examiner—Reena Aurora
(74) Attorney, Agent, or Firm—Madan, Mossman & Sriram, P.C.

(57) ABSTRACT

An improved induction tool for formation resistivity evaluations. The tool provides electromagnetic transmitters and sensors suitable for transmitting and receiving magnetic fields in radial directions that are orthogonal to the tool's longitudinal axis with minimal susceptibility to errors associated with parasitic eddy currents induced in the metal components surrounding the transmitter and receiver coils. The present invention provides increased effective tool surface impedance by increasing self-inductance of the paths in which induced eddy currents flow on the surface of the multi-component induction instruments. The tool enables downhole tool designers to build more effective and better-protected radial induction arrays for existing and future downhole instruments operating in the frequency and/or time domains. In this case the array measurement results contain information primarily about the formation's vertical resistivity. The tool makes it possible to combine radial arrays with coaxial arrays that conventionally measure horizontal formation resistivity. This combination enables obtaining a full resistivity tensor to evaluate formation resistivity anisotropy. The tool provides a composite non-conductive housing to reduce or even avoid the effects of parasitic eddy currents flowing on the tool surface. The tool provides a non-magnetic housing that is conductive which reduces the effects of conductive materials near coils and, primarily, the receiver. The tool provides a non-conductive coating is placed over the housing to prevent high frequency eddy currents from leaking from the housing in the conductive mud of the adjacent wellbore and returning to the housing.

18 Claims, 6 Drawing Sheets

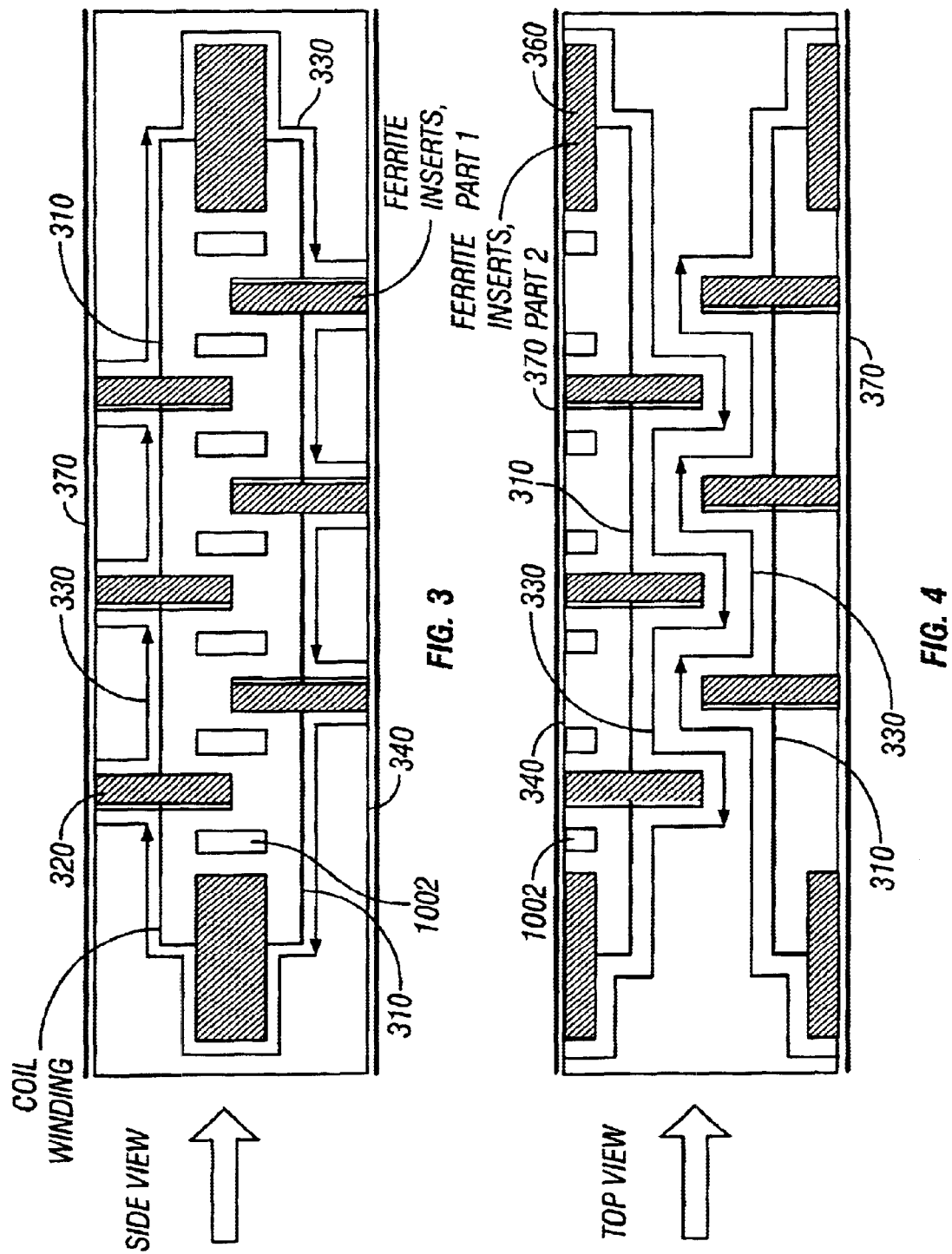

MULTI-COMPONENT INDUCTION INSTRUMENT

BACKGROUND OF THE INVENTION

1. Field of the Invention

The present invention relates to the field of induction resistivity measurements for evaluation of potential hydrocarbon bearing formations using downhole induction instruments having reinforced metal mandrel (monitoring while drilling—MWD) or significant amounts of electrically conductive part parts in or around the sensor section. The present invention provides for compensation of eddy currents induced in the tool body which create additive error signals that interfere with resistivity measurements.

2. Summary of the Related Art

Electromagnetic induction resistivity well logging instruments are well known in the art. These induction resistivity well logging instruments are used to determine the electrical conductivity, or its converse, resistivity, of earth formations penetrated by a borehole. Formation conductivity has been determined based on results of measuring the magnetic field due to eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829–858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et a. and in U.S. Pat. No. 5,600,246 issued to Fanini et al.

The conventional geophysical induction resistivity well logging tool is a probe suitable for lowering into the borehole and it comprises a sensor section and other, primarily electrical, equipment for acquiring the data to determine the physical parameters that characterize the formation. The sensor section, or mandrel, comprises induction transmitters and receivers positioned along the instrument axis and arranged in the order according to particular instrument specifications. The electrical equipment generates an electrical voltage to be further applied to a transmitter induction coil, conditions the signals coming from receiver induction coils, processes the acquired information. The acquired data then has been stored or by means of telemetry sent to the earth's surface through a wire line cable used to lower the tool into the borehole.

In general, when using a conventional induction logging tool with transmitters and receivers (induction coils) having their magnetic moments oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Thus, in a vertical borehole, a conventional induction logging tool with transmitters and receivers (induction coils) oriented only along the borehole axis responds to the average conductivity that combines the conductivity of both sand and shale. These average readings are usually dominated by the relatively higher conductivity of the shale layers. To address this problem, loggers have turned to using transverse induction logging tools where transmitters and receivers (induction coils) have their magnetic moments oriented transversely with respect to the tool longitudinal axis. The instrument for transverse induction well logging was described in U.S. Pat. No. 5,781,436 issued to Forgang et al.

In the transverse induction logging tools the response of transversal coil arrays is also determined by an average conductivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with the transversal induction logging tool can be used for determining the conductivity of individual shale and sand layers.

One of the main difficulties in interpreting the data acquired by a transversal induction logging tool is associated with its response vulnerability of to borehole conditions. Among these conditions there are a presence of a conductive well fluid as well as well bore fluid invasion effects. A known method for reducing these unwanted impacts on a transversal induction logging tool response was disclosed in L. A. Tabarovsky and M. I. Epov, *Geometric and Frequency Focusing in Exploration of Anisotropy Seams*, Nauka, USSR Academy of Science, Siberian Division, Novosibirsk, pp. 67–129 (1972) and L. A. Tabarovsky and M. I. Epov, *Radial Characteristics of Induction Focusing Probes with Transverse Detectors in an Anisotropic Medium*, Soviet Geology And Geophysics, 20 (1979), pp. 81–90.

The known method has used a transversal induction logging tool comprising induction transmitters and receiver (coils). By irradiating a magnetic field the induction transmitter induces currents in the formation adjoining the borehole; in turn, the receivers measure a responding magnetic field due to these currents. To enable a wide range of vertical resolution and effective suppression of the unwanted borehole effects, measurements of magnetic field form the formation can be obtained at different distances between the transmitter and receiver. However, even with these modifications, the data logs obtained with a conventional transversal induction logging instruments can be inconsistent, difficult to interpret, and the problems have been exacerbated while logging through a sequence of layers.

In the induction logging instruments the acquired data quality depends primarily on the electromagnetic environment in which the tool operates. Thus, in an ideal case, the logging tool measures signals induced only by eddy currents excited in the formation by the primary magnetic field of the induction transmitter. Variations in the magnitude and phase of the eddy currents occurring in response to variations in the formation conductivity are reflected as respective variations in the output voltage of induction receivers. In conventional induction instruments these receiver voltages are signal conditioned and then processed using analog phase sensitive detectors or, primarily, algorithmically. The processing allows for determining both receiver voltage amplitude and phase with respect to the induction transmitter current or its magnetic field waveform.

As in an open hole induction logging, the induction instruments currently deployed in monitoring while drilling (MWD) operations typically utilize solenoid-type transmitter and receiver induction coils coaxial with the tool mandrel. These instruments produce a "classical" set of induction measurements in the propagation mode, measuring attenuation and phase shift in the transmitted magnetic field due to the influence of the adjacent formation. Known induction tools utilize two coaxial receiver coils positioned in the center of the mandrel and two sets of balanced transmitter coils on both sides of the receiver coils. This balanced coil configuration, when operating at two frequencies of 400 kHz and 2 MHz, enables the typical known induction instrument to quantitatively evaluate eight directional horizontal formation resistivities for a plurality of investigation depths.

As a general rule for induction tool design, a high degree of magnetic coupling between the tool transmitter and the formation and the tool receiver and the formation is desirable. This high magnetic coupling between the tool transmitter/receiver and the formation facilitates increased instrument efficiency and increased overall signal to noise ratio. However, the presence of conductive bodies typically found in the mandrel of known induction instruments becomes problematic, resulting in appearance of an additional and unavoidable magnetic coupling between these bodies and different sources of electromagnetic radiation reception. Primarily, parasitic magnetic coupling between the transmitter, receiver and formation from one side and the conductive metal parts of the downhole tool from another side creates problems associated with parasitic eddy currents induced on the tool body surface.

The parasitic eddy currents flowing on the surface of the downhole tool produce undesirable magnetic fields that interact with resistivity measurements as additive error components. These induced magnetic fields reduce the overall transmitter moment, couple directly into the receiver coil(s) and create undesirable offsets in measurement signals. Moreover, eddy currents are temperature and frequency dependent that makes their adverse effects difficult, if not impossible to account and compensate for by known methods. Thus, there is a need for a method and apparatus that compensates for the adverse effects of eddy currents.

SUMMARY OF THE INVENTION

The present invention provides improved measurement capabilities for induction tools for formation resistivity evaluations. The present invention provides electromagnetic transmitters and sensors suitable for transmitting and receiving magnetic fields in radial directions that are orthogonal to the tool's longitudinal axis with minimal susceptibility to errors associated with parasitic eddy currents induced in the metal components surrounding the transmitter and receiver coils. The present invention provides increased effective tool surface impedance by increasing self-inductance of the paths in which induced eddy currents flow on the surface of the multi-component induction instruments.

The present invention enables downhole tool designers to build more effective and better-protected radial induction arrays for existing and future downhole instruments operating in the frequency and/or time domains. In this case the array measurement results contain information primarily about the formation's vertical resistivity. The present invention makes it possible to combine radial arrays with coaxial arrays that conventionally measure horizontal formation resistivity. This combination enables obtaining a full resistivity tensor to evaluate formation resistivity anisotropy.

In one aspect, the present invention provides a composite non-conductive housing to reduce or even avoid the effects of parasitic eddy currents flowing on the tool surface. In another aspect, the present invention provides a non-magnetic housing that is conductive which reduces the effects of conductive materials near coils and, primarily, the receiver. In another aspect of the invention, a non-conductive coating is placed over the housing to prevent high frequency eddy currents from leaking from the housing in the conductive mud of the adjacent wellbore and returning to the housing.

BRIEF DESCRIPTION OF THE DRAWINGS

FIG. 3 and FIG. 4 are side views of a preferred embodiment illustrating radial and longitudinal ferrite inserts to minimize eddy currents on the tool surface flowing due to a radial transmitter filed;

DETAILED DESCRIPTION OF A PREFERRED EMBODIMENT

The transmitter and receiver coil geometric areas together with the transmitter current define a total magnetic moment of an induction tool. By design, these coils are built preferably with an effective geometrical area sufficiently large to achieve the maximum possible random noise-free measurements while using conventional amounts of electrical power available to MWD equipment. A coil geometric area would be sufficiently large when non-productive losses that may occur while generating the primary magnetic field or detecting the secondary magnetic field flux induced from the formation are either adequately compensated for or properly accounted for. In many circumstances these limitations can be evaluated from the basic physics principles, i.e., from boundary conditions for the magnetic field being in a close proximity to a conductive and/or ferromagnetic materials or propagating along these parts.

It is known from the electromagnetics field science that if an externally generated alternating magnetic field has been radiated normally to the surface of a conductive body, it will induce eddy currents on this surface. These currents, in turn, produce their own magnetic fields that, in vector sense, oppose to the external field. Generally, the opposing field magnitude increases with increasing material electrical conductivity and decreases with increasing distance to the source. These result in the fact that an integral magnetic flux in a close proximity to a highly conductive metallic surface becomes negligible. For those who are skilled in the art it should be understood that similar effects present in induction MWD instruments having transmitter and receiver coils wound in a close proximity to the metal tool body.

Hence, when a transmitter induction coil is positioned right above a conductive tool surface, the magnetic field of eddy currents induced on the surface opposes the primary source and thus decreases the integral flux radiated into the formation. Conversely, if a receiver induction coil is positioned above a conductive surface, the magnetic field of eddy currents induced on this surface due to formation response will decrease an effective flux crossing the coil. Both processes substantially distort receiver output voltage and, consequentially, lower the tool signal-to-noise ratio.

In the most practical tool designs, the wavelength of the transmitter field is significantly longer than the electromagnetic skin depth of the tool body material or the coil linear dimensions. This fact allows for neglecting active electromagnetic losses in the tool body materials, disregarding phase shifts between surface eddy currents and the driving magnetic field, etc. Surface eddy currents decrease coil geometrical areas, however, when operating frequencies are too high to ignore coil dimensions and/or the tool body material losses, the eddy currents effect becomes more complex and should be analyzed separately for every logging case.

Figure 1:
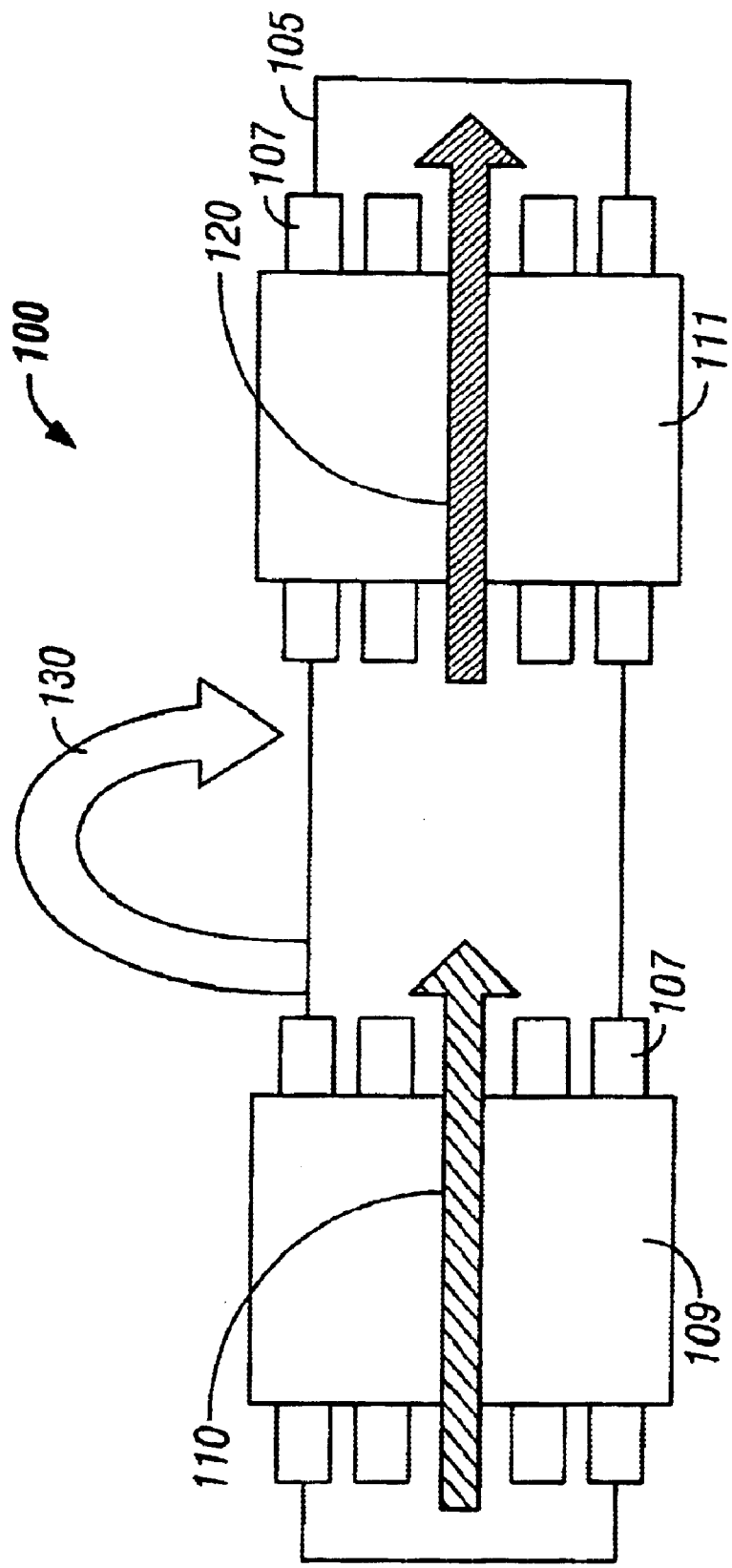
FIG. 1 illustrates circumferential direction of eddy currents that will flow on the surface of the conventional induction MWD instrument with a longitudinally-oriented transmitter magnetic field propagating along the longitudinal axis of the tool body.

Turning now to FIG. 1, FIG. 1 illustrates the direction of the eddy currents flowing on a tool surface with transmitter magnetic fields are oriented and propagating along the longitudinal axis of the tool body. As shown in FIG. 1, a longitudinal magnetic field 110 is generated by transmitter and longitudinal magnetic field 120 is received by the receiver oriented along the longitudinal axis of the tool 100. Surface parasitic eddy currents are generated in the mandrel 105 and circulate on in a circumferential path along the direction 130, as shown in FIG. 1. Non-conductive ferrite inserts 107 in the transmitter collar 109 and receiver collar 111 are utilized for two purposes. The inserts under the transmitter coil 107 increase electrical impedance of the tool surface to allow for a larger flux leak from the coil to be radiated in the formation. Inserts under the receiver coil 107 effectively increase the external field penetration through coil cross-section allowing for larger signal to be measured. Both effects occur due to known behavior of the induction coil wound fully or partially around a ferromagnetic solid. The inserts 107 reduce the effect of circumferential eddy currents on magnetic fields in collars 109 and 111.

Preferably, the tool body is made of non-magnetic but conductive material to reduce often non-liner magnetization effects of this material on the flux transmitted and received by the tool. The tool body can alternatively be made of non-conductive composite material to completely eliminate eddy currents flowing on the tool surface. In this design case, having ferrite inserts 107 under the transmitter coil 109 becomes unnecessary. Having the inserts 107 under receiver 111 would still be desirable for attracting more external flux lines to penetrate through its cross-section.

Figure 2:
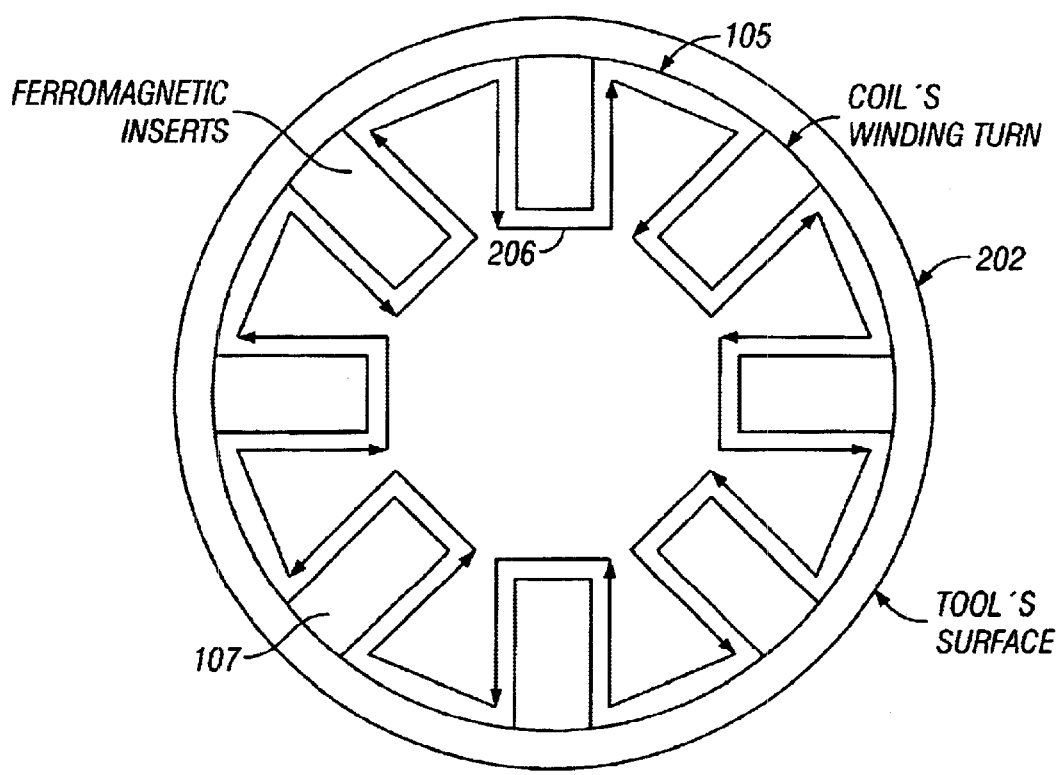
FIG. 2 illustrates a preferred embodiment with a coil that is wound around a tool body inside of collar and has a magnetic moment directed along the tool longitudinal axis body.

Turning now to FIG. 2, coil 202 is shown wound around a tool body 100 inside of collar 109 (or collar 111). Ferrite inserts 107 are shown embedded in the tool surface 105 and within coil winding 202. The tool transmitter radiates in a direction along the tool longitudinal axis and, therefore, induced eddy currents 206 travel circumferentially around ferrite inserts 107 as shown in FIG. 2. The ferrite inserts effectively increase the eddy current travel path and forces this path to exhibit a substantial inductance. The increased effective impedance encountered by the eddy currents flowing through this travel path, around the ferrite inserts, will reduce magnitude of the currents and, respectively, downscale their parasitic effects on effective magnetic fluxes.

Turning now to FIG. 3 and FIG. 4, a preferred embodiment of the present invention is illustrated which provides for placement of induction coils 310 for radiating a transmitter magnetic field in the formation or receiving respective signal from the formation. The magnetic moment of each of these coils has been perpendicular to the longitudinal axis of the tool 340 to support induction measurements from the radial direction. While operating, both primary, i.e., transmitter and secondary, i.e., formation fields mainly induce longitudinal eddy currents 330 on the surface of the tool 340. The present invention increases the tool surface impedance not only within transmitter and receiver coil projections on the tool surface, but outside of these projections on the tool body, as well. As shown in FIG. 3, high magnetic permeability inserts 320 are provided within the coil and outside of the coil 310 along the mandrel to reduce the effect of eddy currents 330 having different travel directions.

Thus, referring to FIG. 3, two major currents are induced by the magnetic field of the radial coil and flowing in opposite directions. A first current is contained within the projection of the coil winding on the tool metal surface and the second current flows outside of this projection. The present invention reduces the influence of longitudinal current streams on the measurement results by providing segment type ferrite inserts 320 arranged coaxial with the tool's longitudinal axis and located primarily within the coil projection on the mandrel surface as shown in FIG. 3. Longitudinal ferrite inserts 360 are similarly placed along the mandrel primarily outside the coil projection area on the mandrel surface, as shown in FIG. 4. These longitudinal inserts extend the path and also increase the effective impedance for circumferential streams of eddy currents traveling outside of the coil projection on the tool surface. That is, FIG. 4 demonstrates the principle of the surface eddy current suppression by means of increasing the tool surface inductive impedance. The ferrite inserts being embedded in the surface forced currents to flow in multiple loops, simultaneously increasing inductance of these loops and their impedance to the current circulation. Preferably, a plurality of longitudinal inserts are provided instead of a single insert on each side of the coil. By applying similar consideration, those who are skilled in the art would find that in the case of the receiver coil used per the present invention ferrite inserts within the coil projection on the tool surface effectively increase the coil area.

In a preferred embodiment, a non-conductive coating 360 is placed over tool 340 to restrict eddy currents 330 from leaking into conductive fluid filling the wellbore surrounding the tool 340.

Effectiveness of the non-conductive coating depends on coating thickness and the coating complex electric permittivity. The coating effectiveness will also operate in converse with the tool operation frequency and, therefore, the coating, coating thickness and frequency should be selected properly. A good engineering practice would require a capacitive impedance introduced by this coating between the tool surface and borehole fluid to be at least an order of magnitude higher than the integral inductive impedance the surface eddy currents experience to. For those who are skilled in the art would see that these two reactive impedances may present a series resonance circuit that could destroy measurement phase stability and quality, primarily in boreholes filled with high conductivity fluids.

It is known that a ferromagnetic body placed in a less magnetic volume "filled" with magnetic flux lines acts as a flux concentrator, i.e., the flux lines are distorted in a way that a majority of the lines pass through the ferromagnetic body. The analogue to this effect can be found in an electrical current (flux) flowing through the circuit and selecting the minimal electrical (magnetic) impedance to flow. In accordance with this analogue, volumes containing ferromagnetic inclusions are known as having smaller "magnetic" impedance to the flux lines routing. For downhole MWD applications this means that improper coil position within close proximity to the ferromagnetic tool parts and components (such as a tool body) might significantly change MWD transmitted and received magnetic fluxes. Moreover, for some embodiments this can create an effect completely compromising the above mentioned advantages. Thus, it may result in suppression of magnetic field transmitted to and received from the formation as shown in FIG. 5.

Figure 5:
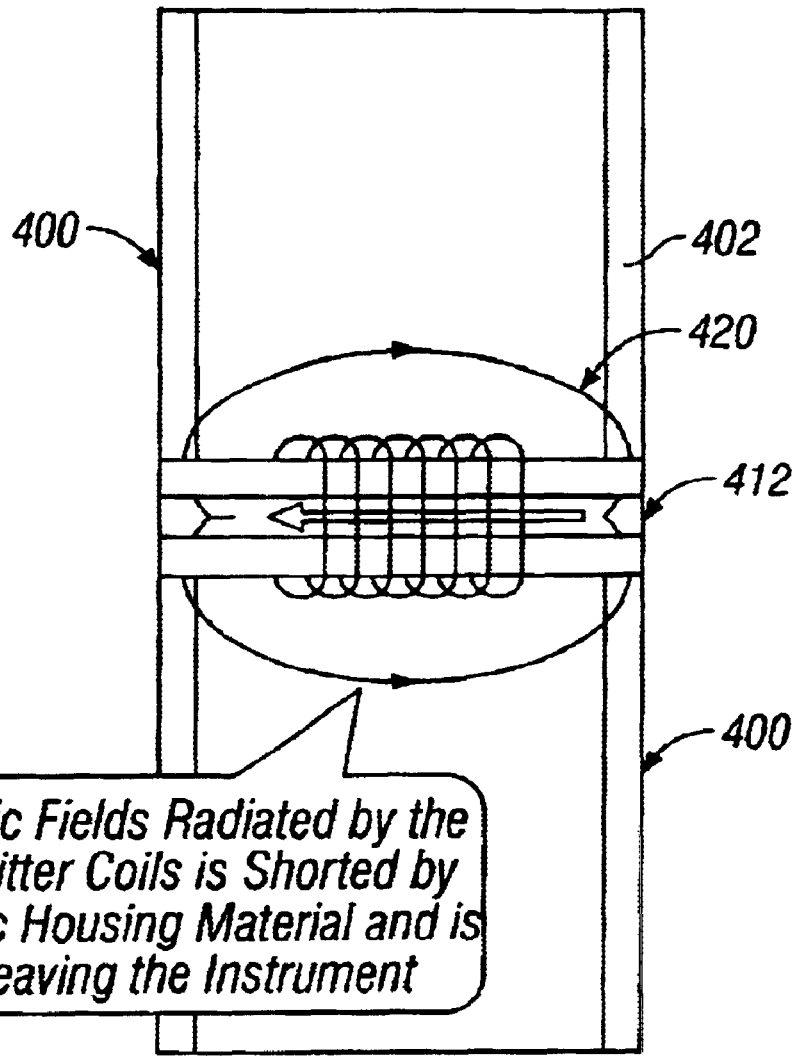
FIG. 5 is an illustration of a conductive housing interfering with a transmitted magnetic field in the case when tool housing contains ferro-magnetic inclusions.

FIG. 5 illustrates a negative effect of a tool pressure housing 402 built from magnetic material. As shown in FIG. 5, a transmitter coil 410 has been wound on the ferrite core 412 that has been positioned inside the tool metal housing and connects both external MWD surfaces 400. Depending on the ratio of magnetic permeability of the ferrite 412 to the housing 402 one, the magnetic flux 420 can be partially or fully trapped inside the body and never leave the tool.

Figure 6:
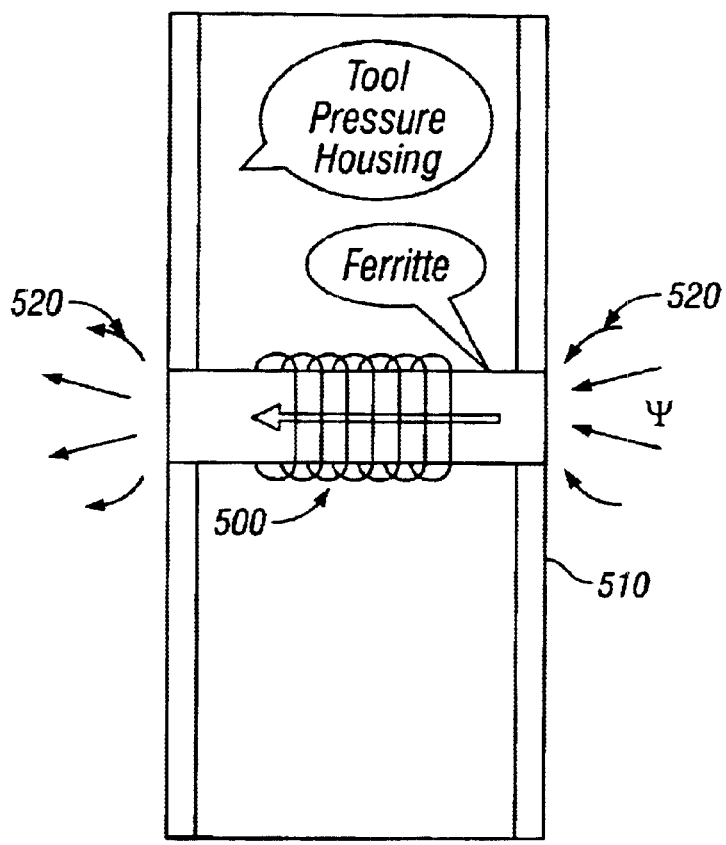
FIG. 6 is an illustration of a ferrite insert inside of a coil shaping the magnetic flux outside the instrument and in close proximity to a tool surface.

As shown in FIG. 6, applications of ferrite inserts 510 in the transmitter or receiver coils 500 would have different meanings. Thus, in case of receiver coil it results in the increased magnetic flux density 520 inside the coil's core compared to the external field to be measured. If the transmitter coil current is set (as with supplying it with a "current" source), however, the presence or absence of the ferromagnetic core does not practically affect the radiated field except for some increased flux line concentration per unit of cross sectional area in close proximity to the coil. Thus, the ferrite inside of the transmitter coil serves primarily as a "container" that does not allow transmitter field flux lines to leak inside the instrument. In the case where ferromagnetic inserts are used for the receiver coil, they work as both a "container" and magnetic flux density magnifier.

Figure 7:
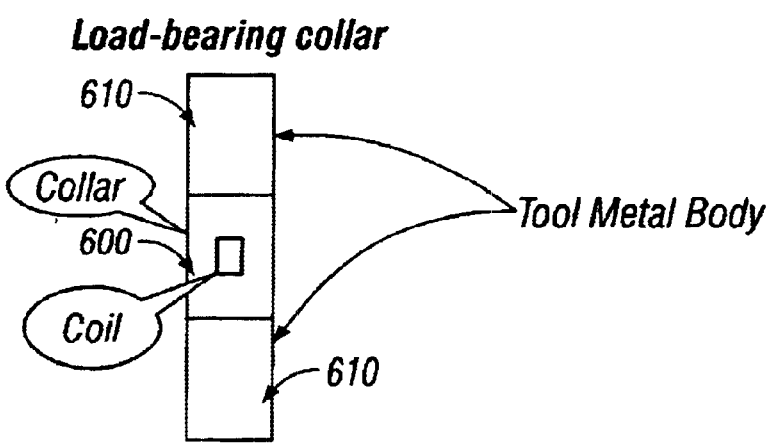
FIG. 7 is an illustration of a preferred collar surrounding a coil.
Figure 8:
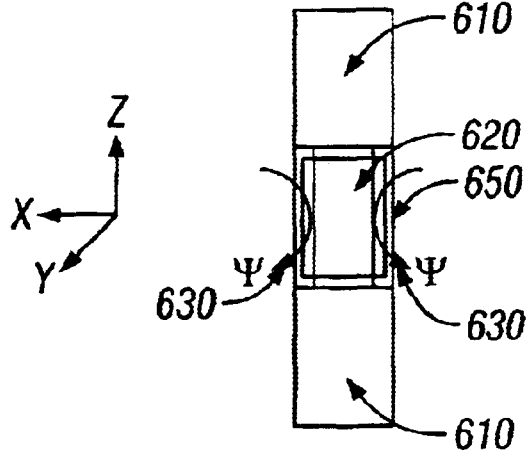
FIG. 8 is an illustration of a preferred collar surrounding a coil.
Figure 9:
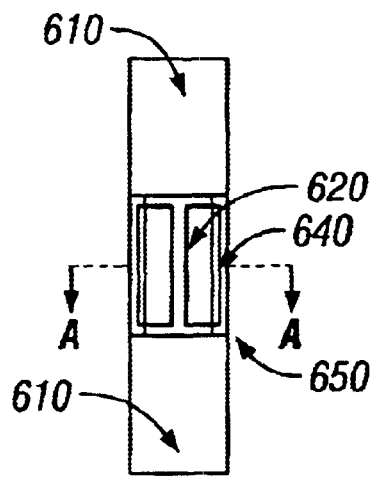
FIG. 9 is an illustration of a preferred collar surrounding a coil.

Turning now to FIG. 7, a preferable solution is shown which provides a nonconductive collar 600, which, in the case of induction measurement instruments is preferably not a load-bearing collar. A preferred embodiment as shown in FIG. 8 comprises a simple hollow composite cylinder 650 mounted coaxial with the instrument on the tool external surface with the coil 640 buried inside the composite collar. In this case the thickness of the collar introduces a gap between the collar 650 surface and external surface of the central pipe 620. This arrangement enables the magnetic flux 630 to penetrate in coil leaking through the gap, i.e., between coil wires and external surface of the metal pipe.

Figure 10:
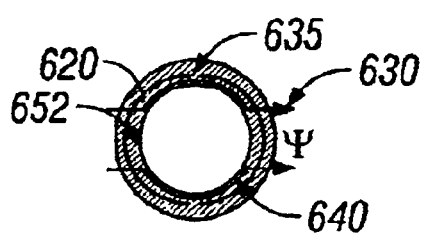
FIG. 10 is a cross sectional area of the coil and collar of FIG. 9.

Moreover, the composite filling the gap further comprises embedded ferromagnetic fibers 635 oriented normally to the collar surface, as shown in FIG. 10, thereby increasing the coil effectiveness (primarily for the receiver). An inner cylindrical composite 652 is added with ferromagnetic fibers oriented along a circle in a plane perpendicular to tool axis. The fibers in this inner cylindrical composite part guide magnetic flux lines around a central structural metallic MWD component 620. To facilitate this aspect of the tool implementation, the central structural metallic MWD component 620 is made of a non-ferromagnetic metallic material.

In a preferred embodiment, all radial the coil windings are preferably symmetrical with respect to the external tool surface; longitudinal coil windings have the same axis of symmetry as the tool itself by design. The overall benefits of symmetrical windings in induction tool are known in the art and have been supported by numerical modeling results and experimental field data. In case of MWD instruments, in particular, the asymmetrical windings cause non-symmetric eddy currents traveling in different locations in the instrument. Being parasitic, the magnetic fields due to these currents are almost impossible to cancel, that is, using asymmetrical windings would result in unwanted signal pick-up and cross-talk between coils, distortion of the tool's calibration and introduce the data interpretation difficulties.

In a preferred embodiment, the radial transmitter and receiver coil are each wound around the tool surface, having an even number of turns and symmetrically wound, that is, half of the coil windings going on one side of the tool and the other half—on the opposite side. In this case the radial coils provided inside of the collar, are symmetrically wound so that their total magnetic moment in the axial direction is substantially equal to "zero".

The above example of a preferred embodiment has been provided for illustration purposes only and is not intended to limit the scope of the invention which is determined by the following claims.

What is claimed:

1. A monitoring while drilling tool having a housing made of metallic materials exhibiting non-magnetic or low magnetic permeability and sufficient mechanical strength to su port the tool in a down hole environment further comprising: a coil for transmitting and receiving a magnetic field associated with a formation down hole; and ferromagnetic inserts made from ferro-magnetic materials placed substantially in the tool housing for elongating the paths of eddy currents associated with the coil flowing in the tool surface.

2. The monitoring while drilling tool of claim 1 wherein the coil has magnetic moment substantially aligned with a tool longitudinal axis and ferro-magnetic inserts are placed in a plane perpendicular to the tool longitudinal axis.

3. The monitoring while drilling tool of claim 1 wherein the ferro-magnetic materials are placed in the tool housing substantially or partially in a plane at a deviated angle not including the tool longitudinal axis for elongating the path of circumferential eddy currents flowing in the tool body.

4. The monitoring while drilling tool of claim 1 further comprising ferro-magnetic materials the monitoring while drilling tool housing to concentrate and route formation magnetic flux associated with the formation into the tool and across tool thereby guiding the magnetic flux through the tool to sensors or receiver coils in such way to increase tool sensitivity to the received magnetic flux.

5. The monitoring while drilling tool of claim 1 further comprising ferromagnetic fibers orient substantially or partially in a plane perpendicular to the tool longitudinal axis.

6. The monitoring while drilling tool of claim 1 further comprising ferromagnetic fibers placed oriented substantially or partially in a plane at a deviated angle not including the tool longitudinal axis.

7. The monitoring while drilling tool of claim 1 further comprising
    ferromagnetic inset in the monitoring while drilling tool housing to focus transmitted magnetic fields by concentrating more effectively magnetic flux lines into the formation; and
    ferromagnetic inserts in the monitoring while drilling tool for focusing and amplification magnetic fields from formation.

8. The monitoring while drilling tool of claim 1 further comprising
    ferromagnetic inserts made from ferro-magnetic materials placed substantially or partially in the tool housing in a plane perpendicular to the tool longitudinal axis for elongating the paths of longitudinal eddy currents flowing in the tool surface;
    magnetic inserts made from ferromagnetic materials, placed in the tool housing substantially or partially in a plane at a deviated angle not including the tool longitudinal axis for elongating the path of circumferential eddy currents flowing in the tool body; and
    ferromagnetic materials the monitoring while drilling tool housing to concentrate and route formation magnetic flux into the tool and across tool thereby guiding magnetic flux through the tool to sensors or receiver coils in such way to increase tool sensitivity to the received magnetic flux.

9. The monitoring while drilling tool of claim 1 further comprising
    ferromagnetic fibers placed substantially or partially in a plane at a deviated angle not including the tool longitudinal axis;
    a symmetric, coil construction for ferromagnetic materials to route measured magnetic fields around monitoring while drilling internal components;
    ferromagnetic material placed at the tool surface for controlling surface eddy currents induced exclusively by the transmitter magnetic fields or secondary fields induced in the formation, wherein surface eddy currents control is implemented in external and internal tool surfaces; and
    a nonconductive coating external to the tool and in drill string sections above and below the tool for the suppressing of eddy currents.

10. The monitoring while drilling tool of claim 1, further comprising ferromagnetic materials in a cylindrical form placed in the area next to, inside or outside sensors or receiver coils, or built in a single block form including the sensors and receiver coils with magnetic fibers uniformly oriented along circular direction perpendicular to the tool longitudinal axis, her comprising magnetic fibers oriented along a near circular direction in a plane not coinciding with the tool longitudinal axis.

11. The monitoring while drilling tool of claim 1 wherein the coil has a magnetic moment substantially aligned perpendicular with a tool longitudinal axis and ferro-magnetic inserts are placed in a plane parallel to the tool longitudinal axis.

12. A monitoring while drilling tool comprising a symmetric, coil construction having ferro-magnetic materials placed between said coil and a tool housing to route measured magnetic fields associated with the formation around internal components inside the tool housing.

13. The monitoring while drilling tool of claim 12 further comprising ferromagnetic material placed at the tool surface for controlling surface eddy currents induced exclusively by transmitter magnetic fields or secondary fields induced in the formation.

14. The monitoring while drilling tool of claim 12 wherein surface eddy currents control is implemented in external and internal tool surfaces.

15. The monitoring while drilling tool of claim 12, further comprising a nonconductive coating external to the tool and in drill string sections above and below the tool for the suppression of eddy currents.

16. The monitoring while drilling tool of claim 12, further comprising ferromagnetic materials in a cylindrical form placed in the area next to, inside or outside sensors or receiver coils, or built in a single block form including the sensors and receiver coils with magnetic fiber uniformly oriented along circular direction perpendicular to the tool longitudinal axis.

17. The monitoring while drilling tool of claim 16 with magnetic fibers oriented along a near circular direction in a plane not coinciding with the tool longitudinal axis.

18. A monitoring while drilling tool having a housing made of
    metallic materials exhibiting non-magnetic or low magnetic permeability and sufficient mechanical strength to support the tool in a down hole environment;
    ferromagnetic inserts in the monitoring while drilling tool housing to focus transmitted magnetic fields by concentrating more effectively magnetic flux lines into the formation;
    ferromagnetic inserts in the monitoring while drilling tool for focusing and amplification of magnetic fields from the formation;
    magnetic inserts made from ferromagnetic materials placed substantially or partially in the tool housing in a plan perpendicular to the tool longitudinal axis for elongating the paths of longitudinal odd currents flowing in the tool surface;
    magnetic inserts made from ferromagnetic materials, placed in the tool housing substantially or partially in a plane at a deviated angle not including the tool longitudinal axis for elongating the pa of circumferential eddy currents flowing in the tool body;
    ferro-magnetic materials the monitoring while drilling tool housing to concentrate and route formation magnetic flux into the tool and across tool thereby guiding magnetic flux through the tool to sensor or receiver coils in such way to increase tool sensitivity to the received magnetic flux;
    ferromagnetic fibers substantially or partially in a plane perpendicular to the tool longitudinal axis;
    ferromagnetic fibers placed substantially or partially in a plane at a deviated angle not including the tool longitudinal axis;
    a symmetric, coil construction for ferromagnetic materials to route measured magnetic fields around monitoring while drilling internal components;
    ferromagnetic material p aced at the tool surface for controlling surface eddy currents induced exclusively by the transmitter magnetic fields or secondary fields induced in the formation, wherein surface eddy currents control is implemented in external and internal tool surfaces;
    a nonconductive coating external to the tool and in drill string sections above and below the tool for the suppression of eddy currents; and
    ferromagnetic materials in a cylindrical form placed in the area next to, inside or outside sensors or receiver coils, or built in a single black form including the sensors and receiver coils with magnetic fibers uniformly oriented along circular direction perpendicular to the tool longitudinal axis, with magnetic fibers oriented along a near circular direction in a plane not coinciding with tool longitudinal axis.

* * * * *